United States Patent
Chen et al.

(10) Patent No.: US 7,420,812 B2
(45) Date of Patent: Sep. 2, 2008

(54) LATCH FOR SECURING COVER TO COMPUTER ENCLOSURE

(75) Inventors: Yun-Lung Chen, Tu-Cheng (TW); Shao-Bin Zhang, Shenzhen (CN); Jun Tang, Shenzhen (CN); Zhou Xu, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 431 days.

(21) Appl. No.: 11/114,806

(22) Filed: Apr. 26, 2005

(65) Prior Publication Data

US 2006/0108812 A1    May 25, 2006

(30) Foreign Application Priority Data

Oct. 28, 2004    (CN)    .................... 2004 2 0094637 U

(51) Int. Cl.
*H05K 7/00*    (2006.01)
(52) U.S. Cl. .................... 361/724; 361/683; 312/223.1; 312/223.2
(58) Field of Classification Search ................ 361/679, 361/683–686, 724–727, 796; 312/223.1, 312/223.2, 265.5
See application file for complete search history.

(56) References Cited

U.S. PATENT DOCUMENTS

| | | | | |
|---|---|---|---|---|
| 4,909,579 A | * | 3/1990 | Liu | ..................... 312/223.2 |
| 5,197,789 A | | 3/1993 | Lin | |
| 5,660,297 A | | 8/1997 | Liu | |
| 5,743,606 A | * | 4/1998 | Scholder | .................. 312/223.2 |
| 5,967,633 A | | 10/1999 | Jung | |
| 6,134,116 A | * | 10/2000 | Hoss et al. | .................. 361/747 |
| 6,457,788 B1 | * | 10/2002 | Perez et al. | ............... 312/265.5 |
| 6,572,205 B2 | * | 6/2003 | Tagawa | .................. 312/223.1 |
| 6,819,551 B2 | * | 11/2004 | Chen | ............................ 361/683 |
| 6,935,661 B1 | * | 8/2005 | Farnsworth et al. | ......... 292/162 |

FOREIGN PATENT DOCUMENTS

TW    558024    10/2003

* cited by examiner

*Primary Examiner*—Anatoly Vortman
*Assistant Examiner*—Anthony Q Edwards
(74) *Attorney, Agent, or Firm*—Morris Manning Martin LLP; Tim Tingkang Xia, Esq.

(57) ABSTRACT

A latch for securing a cover (10) to a base (40) includes a projecting tab (145) on one of the cover and the base, a mounting member (50) and a resilient member (70). The projecting tab engages with the mounting member so that the cover engages with the base. The mounting member is deformable. The resilient member is compressed by the mounting member. When the mounting member is deformed, the resilient member is released to urge the mounting member to disengage from the projecting tab thereby removing the cover from the base.

16 Claims, 7 Drawing Sheets

LATCH FOR SECURING COVER TO COMPUTER ENCLOSURE

BACKGROUND OF THE INVENTION

1. Field of the Invention

The present invention relates to latches of computer enclosures, and particularly to a latch for conveniently securing a cover to a computer enclosure and removing the cover later therefrom.

2. Background of the Invention

A top cover is usually mounted to a computer enclosure by screws. This conventional mounting means is known that use of large screws is unduly cumbersome and time consuming. The top cover is thus inconvenient to mount to and remove from the computer enclosure by this mounting means.

Another mounting means is disclosed in U.S. Pat. No. 5,660,297. A non-screw assembled casing for computer mainframe comprised of an upper cover, a base and a front panel wherein the non-screw assembling structure comprises a first coupling section structure, a second coupling section structure and a third coupling section structure. The first coupling section structure includes a plurality of first fastening units provided on the bottom edge of the inner right side of the upper cover and on the bottom edge of the right side of the base. The second coupling section structure includes a plurality of second fastening units provided on the bottom edge of the inner left side of the upper cover and on the bottom edge at the left of the base. And the third coupling section structure includes a plurality of third fastening units provided on the back side of the front panel, the periphery of the front side of the upper cover, and the front side of the base. By assembling the first coupling section structure to the second coupling section structure, causing the upper cover to be positioned on the base in the vertical direction and in the lateral direction; and by assembling the third coupling section structure, causing the upper cover to be positioned in the longitudinal direction along with the front panel, a structure can thus be provided into which the computer mainframe can be fixed without requiring fastening by screws. This mounting means described above is more convenient than the screw mounting means in the assembly and disassembly of the cover. However, this mounting means is still awfully inconvenient that the assembly and disassembly of the cover via the front panel.

What is needed, therefore, is a latch that is convenient to fasten a cover to a computer.

SUMMARY

A latch for securing a cover to a base comprises a projecting tab on one of the cover and the base, a mounting member and a resilient member. The projecting tab engages with the mounting member so that the cover engages with the base. The mounting member is deformable. The resilient member is compressed by the mounting member. When the mounting member is deformed, the resilient member is released to urge the mounting member to disengage from the projecting tab thereby removing the cover from the base.

Other advantages and novel features of the present invention will be drawn from the following detailed description of preferred embodiment with attached drawings, in which:

DETAIL DESCRIPTION OF PREFERRED EMBODIMENT

Figure 1:
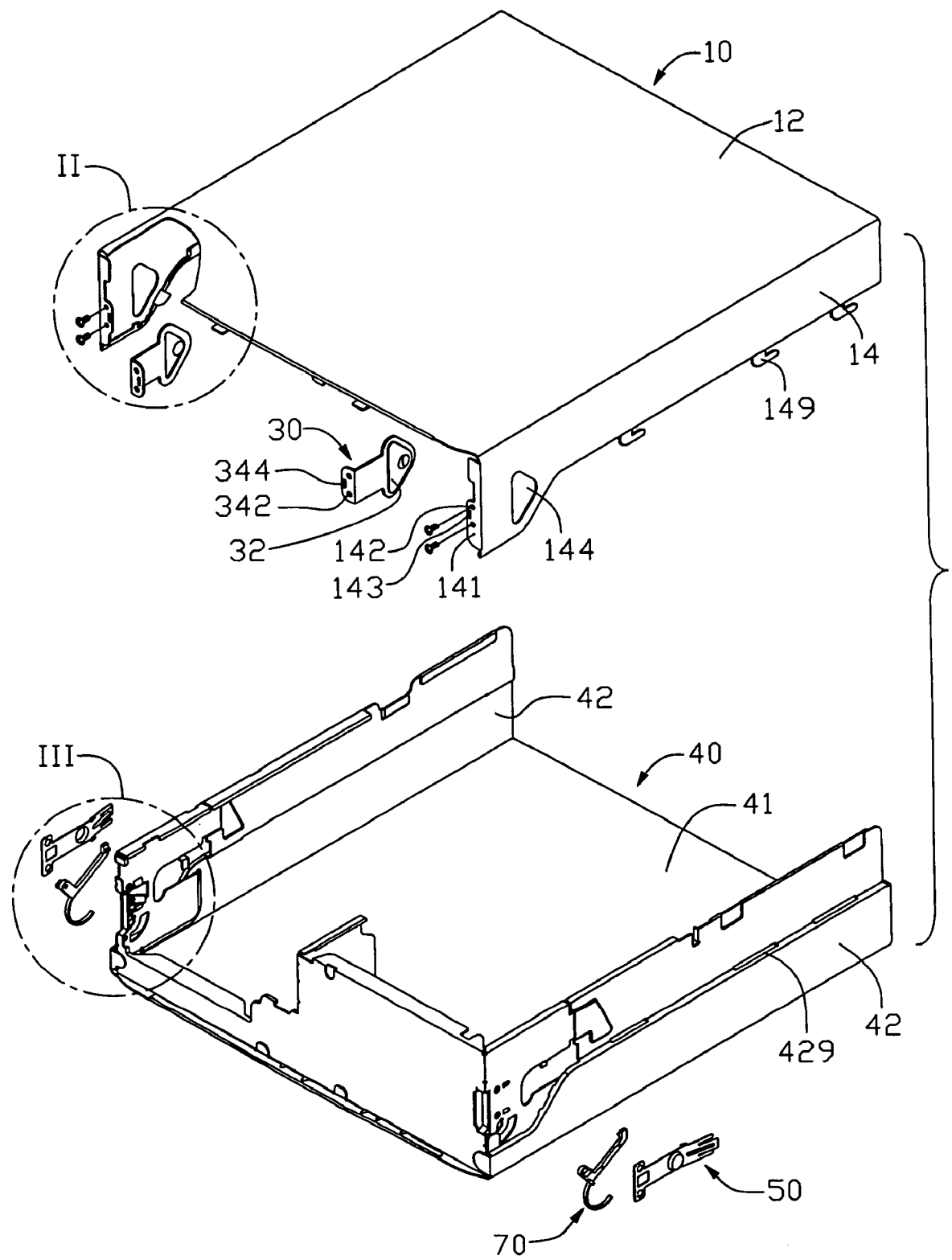
FIG. 1 is an exploded, isometric view of a latch, a cover and a base in accordance with the preferred embodiment of the present invention, the latch comprising a pair of operating members, a pair of mounting members and a pair of resilient members.
Figure 2:
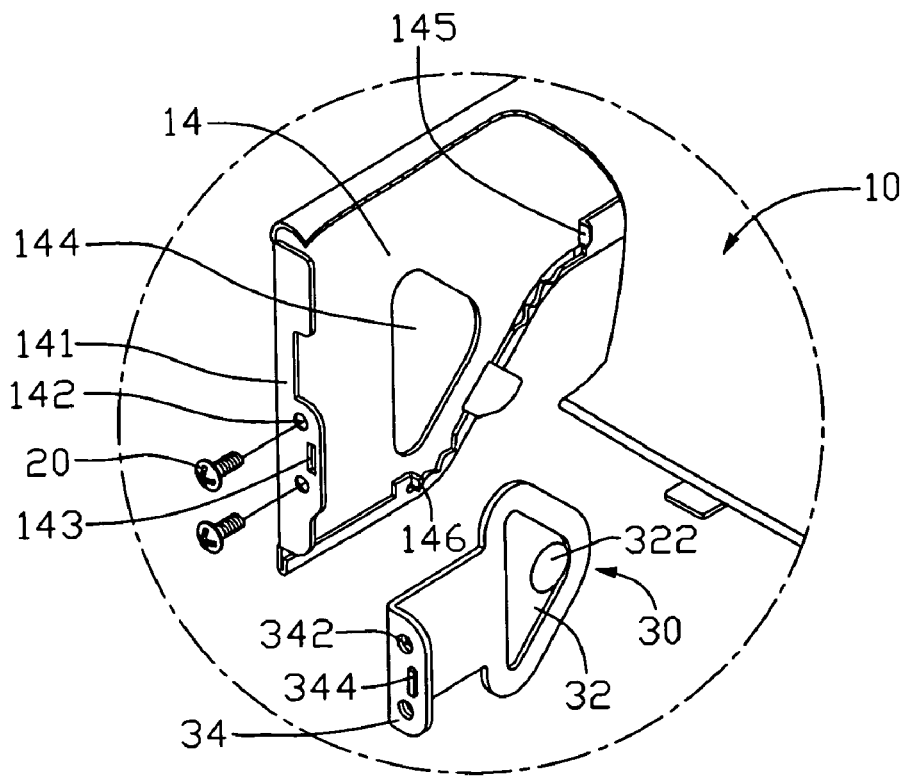
FIG. 2 is an enlarged view of circled portion II of FIG. 1.

Referring to FIGS. 1 and 2, a latch is used to secure a cover 10 to a base 40 of an enclosure of an electronic device like a computer and comprises a pair of operating members 30, a pair of mounting members 50 and a pair of resilient members 70.

The cover 10 has a base plate 12 and a pair of side plates 14 extending perpendicularly from opposite edges of the base plate 12. A flange 141 is formed perpendicular to a front edge of the side plate 14 by stamping. A pair of screw holes 142 is defined in the flange 141. A slit 143 is defined in the flange 141 between the screw holes 142. The side plate 14 defines a guiding opening 144 therein. A projecting tab 145 protrudes from the side plate 14 behind the guiding opening 144. A pushing tab 146 extends from a bottom edge of the side plate 14 below the guiding opening 144. A plurality of hooks 149 projects downwardly from a bottom edge of the side plate 14.

The operating member 30 has an operating portion 32 and a bent portion 34 perpendicular to the operating portion 32. The operating portion 32 adapts to pass through the guiding opening 144 of the side plate 14. A locating protrusion 322 is formed at an inside surface of the operation portion 32 thereof. A pair of screw holes 342 is defined in the bent portion 34 corresponding to the screw holes 142 of the side plate 14. A mounting tab 344 protrudes from the bent portion 34 corresponding to the slit 143 of the cover 10.

Figure 3:
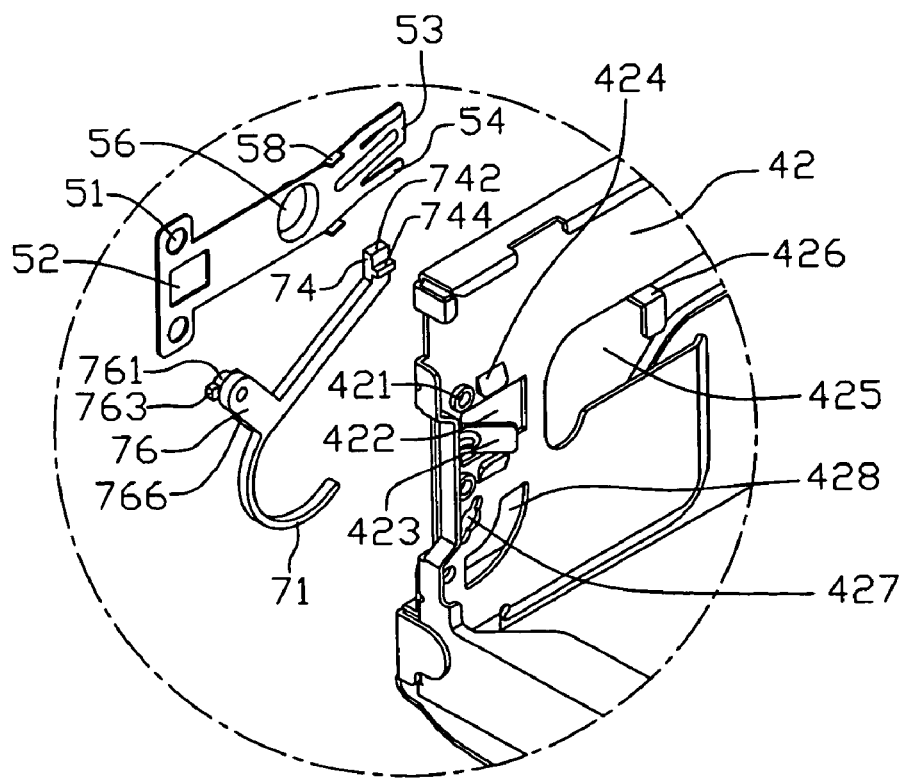
FIG. 3 is an enlarged view of circled portion III of FIG. 1.

Referring to FIGS. 1 and 3, the base 40 has a bottom panel 41 and a pair of side panels 42 perpendicularly extending from opposite edges of the bottom panel 41. A pair of posts 421 with through holes (not labeled) is disposed on inside surfaces of the side panels 42 adjacent to front edges. A through opening 422 is defined adjacent to the posts 421. A tab 423 protrudes inwardly from a front edge of the through opening 422 between the posts 421. A pair of wedge-shaped protrusions 424 is projected on opposite sides of the through opening 422. A slot 425 is defined adjacent to the through opening 422. An L-shaped stopping tab 426 extends from a top edge of the slot 425. The side panel 42 further defines a positioning hole 427 and a sector-shaped sliding slot 428 under the posts 421 therein. The positioning hole 427 has a pair of guiding holes (not labeled). A step is formed at an outside surface of the side panel 42. A plurality of slits 429 is defined in the step corresponding to the hooks 149 of the side plate 14 thereof.

The mounting member 50 defines a pair of mounting holes 51 corresponding to the posts 421 of the side panel 42, and a through opening 52 corresponding to the tab 423 of the side panel 42 thereof. A locking clip 53 is formed at a rear portion of the mounting member 50 by stamping for engaging with the projecting tab 145 of the side plate 14. A pair of locating clips 54 is thus formed at opposite sides of the locking clip 53. A pair of positioning clips 58 protrudes perpendicularly from opposite edges of the mounting member 50 adjacent to the locking clip 53. The mounting member 50 further defines a locating hole 56 corresponding to the locating protrusion 322 of the operating member 30 therein.

Figure 4:
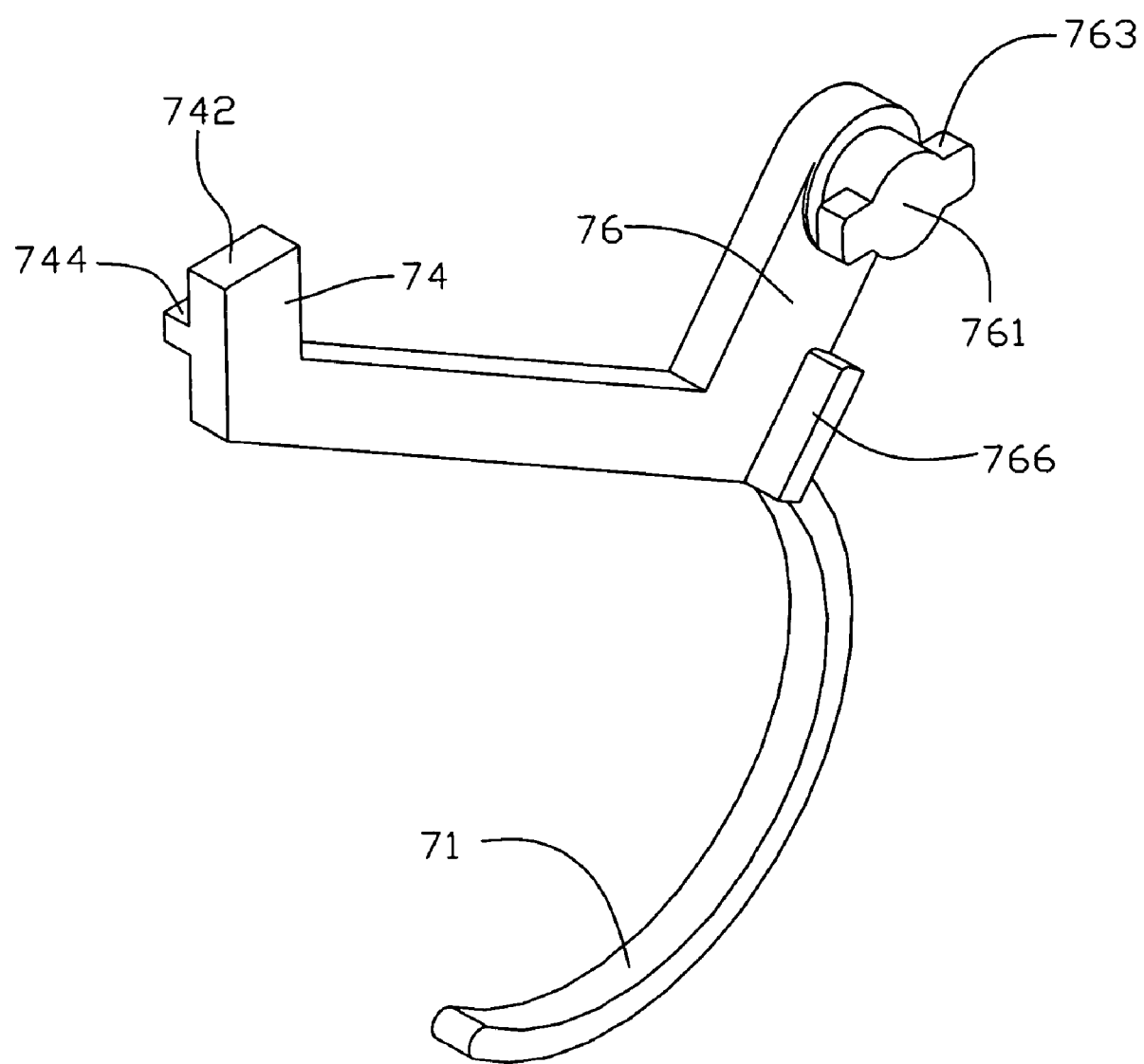
FIG. 4 is another isometric, enlarged view of the resilient member of FIG. 1.

Referring to FIGS. 3 and 4, the resilient member 70 has an arc-shaped resilient portion 71 at one end and a positioning portion 74 at the other end. A step is formed at the positioning portion 74 and has a first positioning surface 742 and a second positioning surface 744 for engaging with the positioning tab 58. An extending portion 76 projects perpendicularly from the resilient member 70 adjacent to the resilient portion 71. The extending portion 76 defines a mounting hole (not labeled) therein. A locating member 761 is rotatably mounted to the mounting hole of the extending portion 76. The locating member 761 has a pair of stopping protrusions 763. An operating tab 766 protrudes from an edge of the extending portion 76 on the other end portion corresponding to the pushing tab 146 of the side plate 14 of the cover 10.

Figure 5:
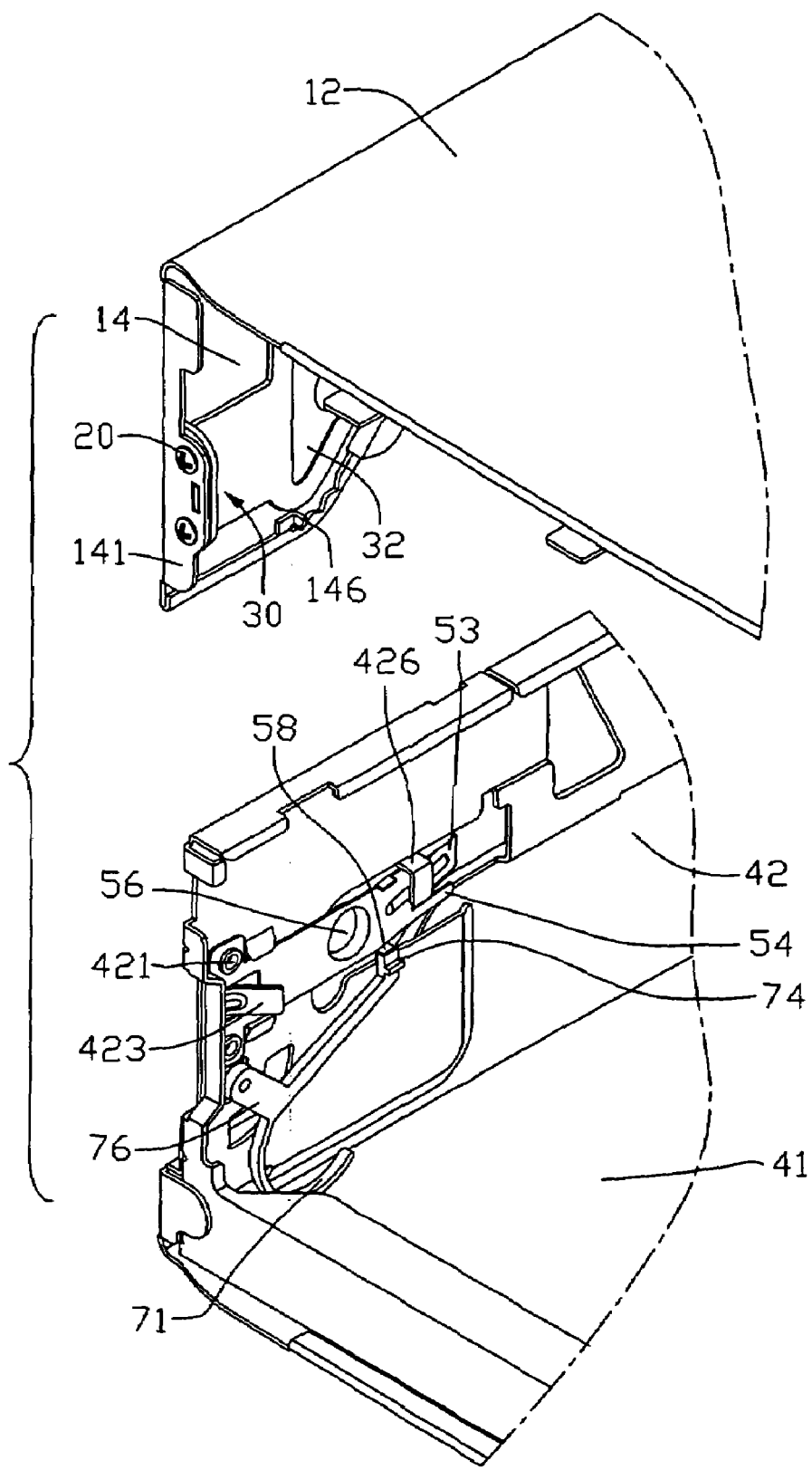
FIG. 5 is a part view of FIG. 1, showing the operating member mounted to the cover, the mounting member and the resilient member mounted to the base.

Referring to FIG. 5, in assembly, the operating members 30 are disposed on the inner sides of the side plates 14 of the cover 10. The mounting tab 344 of the operating member 30 is inserted into the slit 143 of the flange 141 and the screw holes 342 are aligned with the screw holes 142. The operating portion 32 is positioned in the guiding opening 144 of the side plate 14. Mounting means like screws 20 are fastened into the screw holes 342, 142, and the operating members 30 are thus mounted on the side plates 14 of the cover 10.

The mounting member 50 is positioned between the stopping tab 426 and the side panel 42. The tab 423 of the side panel 42 passes through the through opening 52 of the mounting member 50, and the posts 421 are inserted into the mounting holes 51. The operating member 50 is mounted to the side panel 42 by mounting means like screws fastened into the through holes of the posts 421 and the mounting holes 51. The operating member 50 is further positioned between the protrusions 424 of the side panel 42. The locking clip 53 extends through the slot 425, and the locating clip 54 depends on the bottom edge of the slot 425. The locating hole 56 of the operating member 50 is situated in the slot 425. The resilient member 70 is then arranged on the inside surface of the side panel 42. The resilient member 70 deforms elastically so that the resilient member 70 is situated between the mounting member 50 and the bottom panel 41 of the base 40. The resilient portion 71 depends on the bottom panel 41 of the base 40. The resilient portion deforms elastically, so that the first positioning surface 742 of the positioning portion 74 is engaged with a bottom surface of the positioning tab 58 of the mounting member 50. When the stopping protrusions 763 of the locating member 761 align with the guiding holes of the positioning hole 427, the locating member 761 passes through the positioning hole 427. The operating tab 766 is positioned in the sliding slot 428. The locating member 761 is rotated to have the locating member 761 mounted on the outside surface of the side panel 42. The resilient member 70 is thus mounted on the side panel 42 of the base 40.

Figure 6:
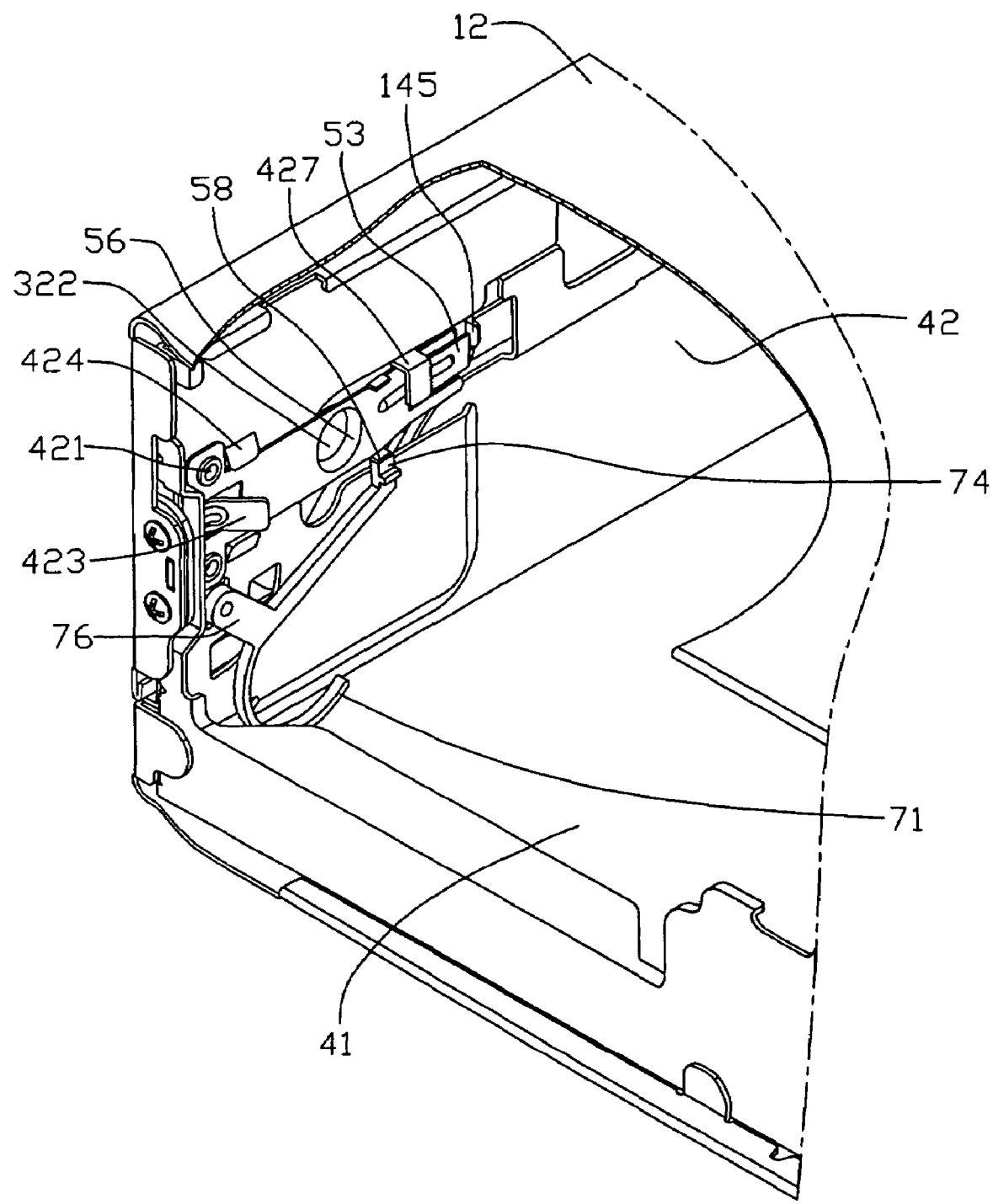
FIG. 6 is similar to FIG. 5, but showing the cover mounted to the base.

Referring also to FIG. 6, when the cover 10 is mounted to the base 40, the hooks 149 of the side plates 14 are inserted into the corresponding slits 429 of the side panels 42. The projecting tab 145 of the plate 14 is situated between the locating hole 56 of the mounting member 50 and the locking clip 53 of the operating member 50. The cover 10 is pushed to slide along the base 40. The projecting tab 145 urges the locking clip 53 to elastically deform inwardly. When the projecting tab 145 is past the locking clip 53, the locking clip 53 rebounds to block the projecting tab 145. The locating protrusion 322 of the operating member 30 engages with the locating hole 56 of the mounting member 50. The cover 10 is prevented from sliding back. The hooks 149 of the cover 10 hook in the slits 429 of the base 40. The cover is thus mounted on the base 40. After assembly, the lower positoning tab 58 of the mounting member 50 abuts on the first positioning surface 742 of the positioning portion 74.

Figure 7:
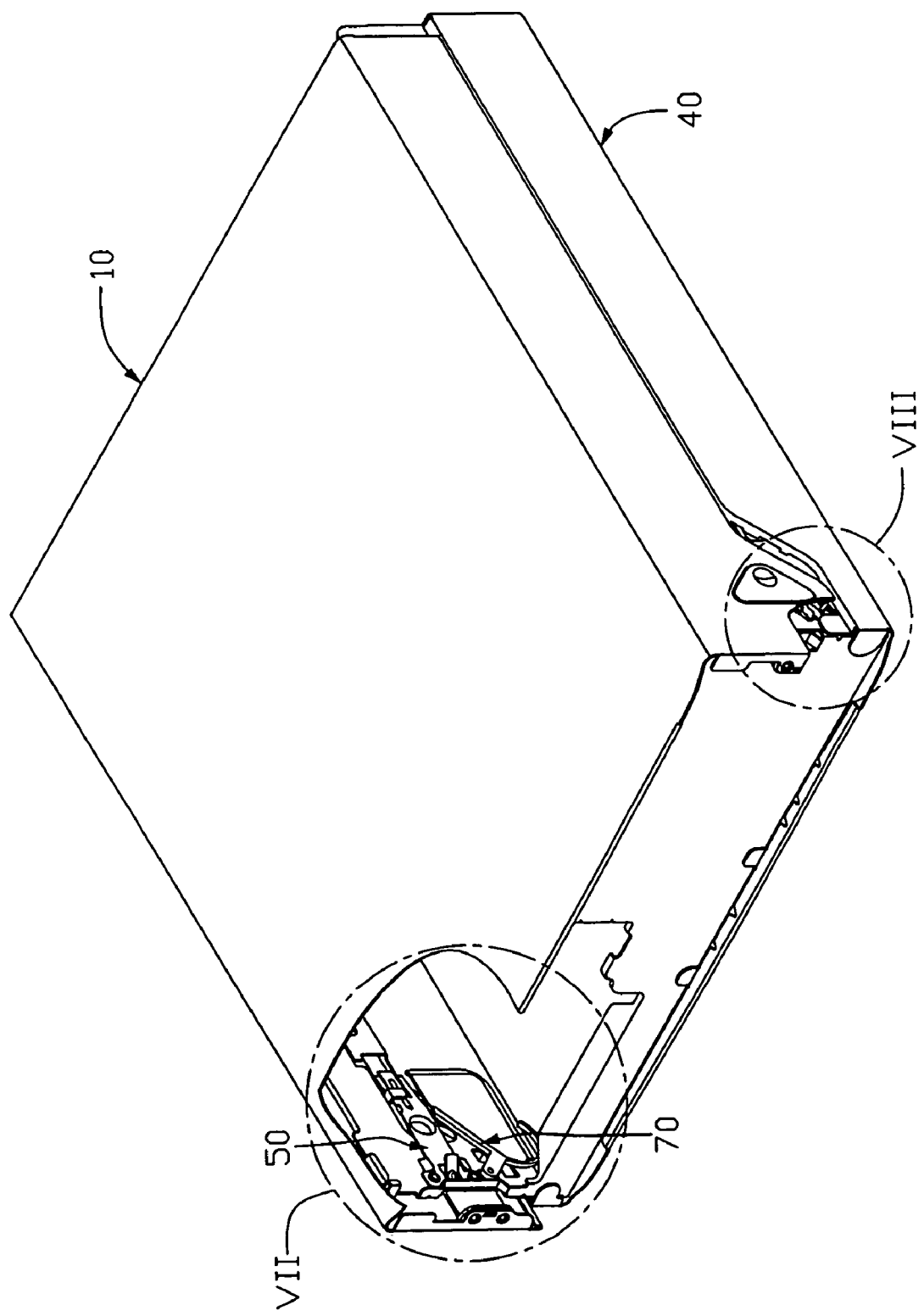
FIG. 7 is a disassembly view of the present invention.
Figure 8:
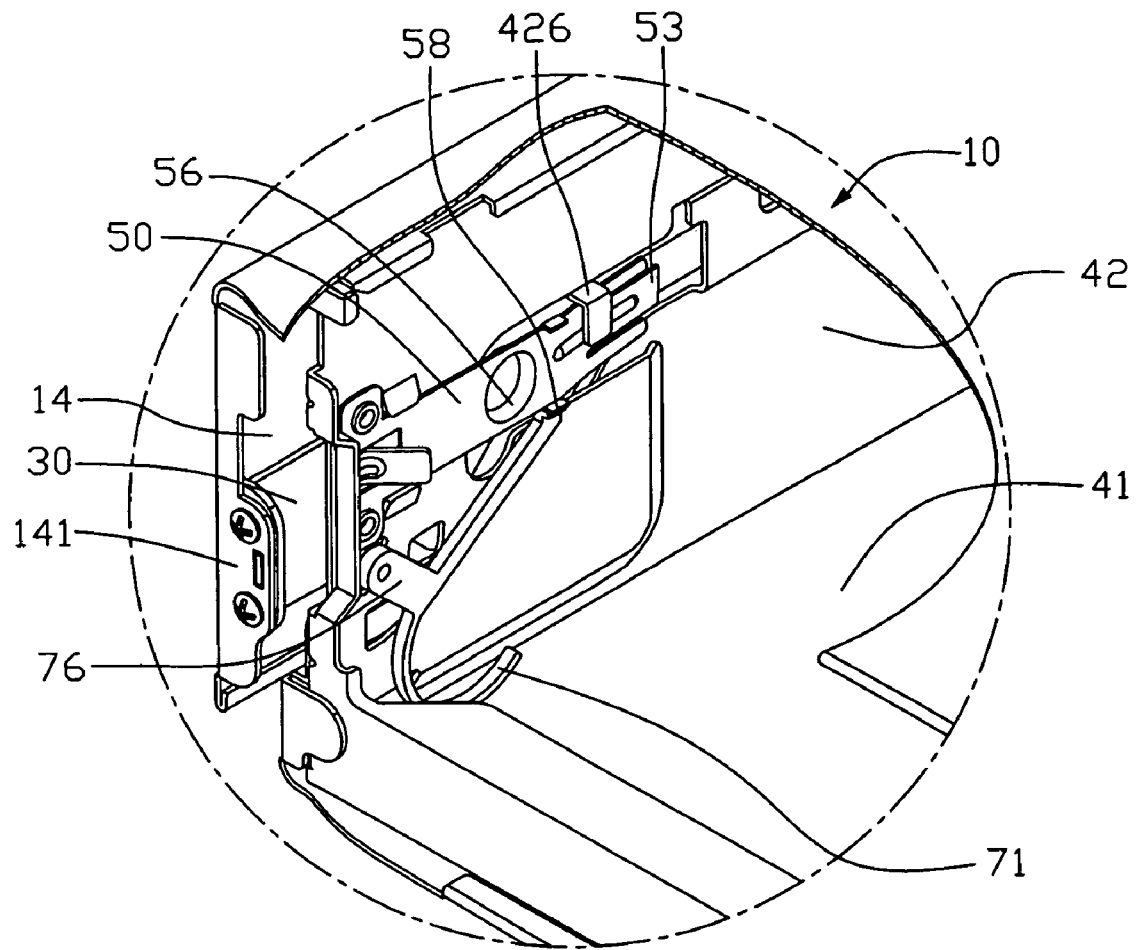
FIG. 8 is an enlarged view of circled portion VII of FIG. 7.
Figure 9:
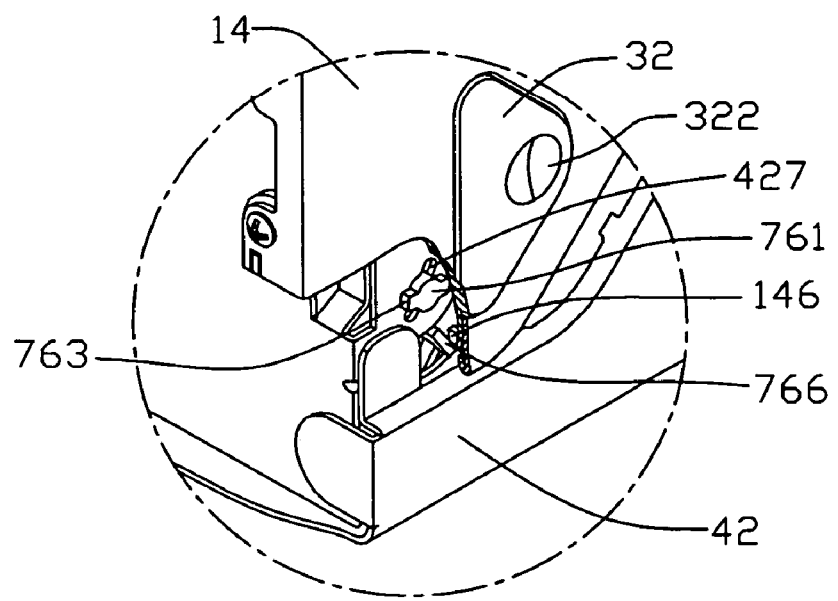
FIG. 9 is an enlarged view of circled portion VIII of FIG. 7.

Referring to FIGS. 7 to 9, in disassembly, the operating portion 32 of the operating member 30 is pressed inwardly. The mounting member 50 deforms elastically inwardly under the pressure of the operating member 30. A gap is generated between the mounting member 50 and the side plate 42. The resilient member 70 rebounds, and the positioning portion 74 slips into the gap. The second positioning surface 744 thus engages with the positioning tab 58. In the same time, the locking clip 53 separates from the projecting tab 145 with the positioning portion 74 inserting the gap. The cover 10 is then pulled reversely along the base 40.

When the cover 10 is pulled reversely, the pushing tab 146 of the cover 10 engages with and presses the operating tab 766 to slide in the sliding slot 428. The resilient member 70 elastically deforms downwardly. The positioning portion 74 is withdrawn from the gap between the side panel 42 and the mounting member 50. When the cover 10 is taken away from the base 40, the pushing tab 146 departs from the operating tab 766. The mounting member 50 rebounds to its original place. The first positioning surface 742 of the positioning portion 74 engages with the positioning tab 58 of the mounting member 50 again.

It is to be understood, however, that even though numerous characteristics and advantages have been set forth in the foregoing description of preferred embodiments, together with details of the structure and function, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A latch for securing a cover to a base comprising:
   a projecting tab formed on the cover;
   a mounting member formed on the base, and resiliently deformable from a first position where the projecting tab engages with the mounting member so as to secure the cover to the base, to a second position where the mounting member releases the projecting tab for thereby removing the cover from the base; and
   a resilient member formed on the base, the resilient member being resiliently deformed by the mounting member when the mounting member is in the first position, and released from the mounting member to rebound to retain the mounting member in the second position when the mounting member is deformed from the first position to the second position;
   wherein the resilient member has an operating tab, and a pushing tab is formed on the cover to urge the operating tab to elastically deform so that the mounting member rebounds from the second position to the first position;
   wherein the base defines a sliding slot therein, and the operating tab of the resilient member is inserted into the sliding slot of the base to engage with the pushing tab of the cover.

2. The latch as described in claim 1, further comprising an operating member, wherein the operating member is attached to the cover for deforming the mounting member.

3. A computer enclosure comprising:
a cover having a projecting tab;
a base;
a mounting member installed on the base, and engaging with the projecting tab to secure the cover on the base; and
a resilient member installed on the base, the resilient member being resiliently deformed when the cover is secured on the base, and rebounding to retain disengagement between the mounting member and the projecting tab of the cover when the mounting member is urged to disengage from the projecting tab so that the cover can be removed from the base;
wherein the resilient member has an operating tab, and the cover has a pushing tab for engaging with the operating tab and urging the resilient member to elastically deform to have the mounting member rebounding to engage with the projecting tab of the cover;
wherein the cover defines a sliding slot therein, and the operating tab of the resilient member slides in the sliding slot to engage with the pushing tab of the cover.

4. The computer enclosure as described in claim 3, wherein a slot is defined in the base for deforming the mounting member.

5. The computer enclosure as described in claim 3, wherein the cover defines a guiding opening therein, and the mounting member is deformed via the guiding opening.

6. The computer enclosure as described in claim 3, wherein the resilient member has a positioning portion for inserting into a space between the mounting member and the base to retain disengagement between the mounting member and the projecting tab.

7. The computer enclosure as described in claim 6, wherein the positioning portion of the resilient member has a first positioning surface for engaging with the mounting member when the projecting tab engages with the mounting member, and a second positioning surface parallel to the first surface, for supporting the mounting member when the projecting tab disengages with the mounting member.

8. The computer enclosure as described in claim 3, wherein the base comprises a pair of side panels having steps, each of the steps defines a plurality of slits therein.

9. The computer enclosure as described in claim 8, wherein the cover comprises a pair of side plates having hooks on bottom edges for engaging in the slits of the base.

10. A electronic device comprising:
a cover partially enclosing the electronic device;
a base enclosing the electronic device in cooperation with the cover, and allowing the cover being movable beside the base along a first direction parallel to a side panel of the base between a first position where the cover is fixedly installed to the base, and a second position where the cover is removable away from the base along a second direction different from the first direction;
an elastic mounting member attachable to the side panel of the base and movable along a third direction, perpendicular to the first direction, so as to block movement of the cover along the first direction beside the base at a location thereof, and to allow the movement of the cover along the first direction at another location thereof; and
a deformable resilient member attachable to the side panel of the base, the resilient member being deformed and abutting against the mounting member when the mounting member is in the first position, and released from the mounting member to rebound to retain the mounting member in the second position when the mounting member is moved from the first position to the second position.

11. The electronic device as described in claim 10, wherein the mounting member has a locking clip, and the cover has a projecting clip for engaging with the locking clip.

12. The electronic device as described in claim 10, wherein an operating member is attached to the cover for urging the mounting member of the base to move along the third direction between the location and the another location thereof.

13. The electronic device as described in claim 10, wherein the resilient member has an operating tab to engage with a pushing tab of the cover for urging the resilient member deformed elastically.

14. The electronic device as described in claim 10, wherein the resilient member has a positioning portion with a first positioning surface for engaging with the mounting member when the cover is in the first position, and a second positioning surface parallel to the first positioning surface, for supporting the mounting member when the cover is movable to the second position along the first direction.

15. The electronic device as described in claim 10, wherein the resilient member further has an arc-shaped resilient portion formed on one end of the positioning portion thereof.

16. The electronic device as described in claim 13, wherein the cover defines a sliding slot therein, and the operating tab of the resilient member slides in the sliding slot to engage with the pushing tab of the cover.

* * * * *